(12) United States Patent
Kuroda

(10) Patent No.: US 7,372,789 B2
(45) Date of Patent: May 13, 2008

(54) INFORMATION RECORDING AND REPRODUCING APPARATUS, AND INFORMATION RECORDING AND ERASING METHOD

(75) Inventor: Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 581 days.

(21) Appl. No.: 10/891,129

(22) Filed: Jul. 15, 2004

(65) Prior Publication Data

US 2005/0013217 A1    Jan. 20, 2005

(30) Foreign Application Priority Data

Jul. 18, 2003    (JP)    ............... 2003-199226

(51) Int. Cl.
*G11B 7/00*    (2006.01)

(52) U.S. Cl. ............... 369/47.14; 369/53.21

(58) Field of Classification Search ............ None
See application file for complete search history.

(56) References Cited

U.S. PATENT DOCUMENTS 5,897,218 A * 4/1999 Nishimura et al. ............ 386/94
6,469,978 B1    10/2002 Ohata et al. ............ 369/275.3
6,621,783 B1 *  9/2003 Murata ................ 369/53.31
6,834,034 B2 * 12/2004 Yokokawa ............ 369/53.22

FOREIGN PATENT DOCUMENTS

| JP | 62 59307 | 9/1994 |
| JP | 11-039801 | 2/1999 |
| JP | 2002-324383 | 11/2002 |

* cited by examiner

*Primary Examiner*—Brian E. Miller
*Assistant Examiner*—Lixi Chow
(74) *Attorney, Agent, or Firm*—Drinker Biddle & Reath LLP

(57) ABSTRACT

When data is recorded on an optical disc capable of recording information only once, such as a DVD-R and the like, encrypted data obtained by encrypting the recording data and a key for decrypting the encrypted data are generated, and they are recorded in different areas on the recording medium. When the data recorded by the recording method is erased, only a key portion in a file including the key for decrypting the encrypted data is physically made a defect, or is registered as the defect by a defect management system. Thereby, since the key portion becomes unreadable, it becomes impossible that the recording data is restored by decrypting the encrypted data. Therefore, the recording data can be substantially completely erased.

9 Claims, 7 Drawing Sheets

INFORMATION RECORDING AND REPRODUCING APPARATUS, AND INFORMATION RECORDING AND ERASING METHOD

BACKGROUND OF THE INVENTION

1. Field of the Invention

The present invention relates to a method of recording information on a recording medium and erasing the recorded information.

2. Description of Related Art

There is known an information recording and reproducing apparatus capable of recording information on an optical disc, such as a DVD-R/RW and the like, and capable of reproducing and erasing the recorded information. So far, additional recording was performed by a method, such as a UDF (Universal Disk Format) and a multi-session, as for an additionaly-recordable-type recording medium capable of recording information only once, like a DVD-R. In the method, when the recorded information is erased, newest file management information is wholly utilized by additionally recording changed file management information in a new area while a last file management information area is left as it is (see Japanese Patent Application Laid-open under No. 2002-324383).

Namely, a data area is left as it is without any change, and data of the file is not erased from the disc until the data area is overwritten by other files. It takes a long time to completely erase all the contents of the file in the data area, which is not efficient. Therefore, such the method is adopted.

However, in the above-mentioned method of additionally recording the data, the old recorded data remains on the disc, and the information in the last file management information area can be also read. Therefore, even after an erasing command is executed, the recording data which is apparently erased can be actually readout from the information recording medium by reading the information in the old file management information area before the erasure. In addition, even if such file management information before the erasure is deleted, the recording data itself remains on the disc. Therefore, it is possible to restore the recorded data by tracing the portion thereof. Like this, in the conventional erasing method, it is impossible to erase the recorded data in a manner completely unreadable. Thus, there occurs probability that the recorded data which was apparently erased, such as important data including personal information and the like, is restored and watched by the above-mentioned method.

As a method of completely erasing the data which is recorded on the recording medium capable of recording the information only once, there are known a method of destroying the recording medium itself, and a method of making it impossible to read out all the file management information are a by physically overwriting it. However, in those methods, the data other than the data to be erased cannot be read out, either. Further, when the method of overwriting all the file management information area is utilized, it problematically takes a long time for the process.

SUMMARY OF THE INVENTION

The present invention has been achieved in order to solve the above problems. It is an object of this invention to make it possible to erase, in a short time, data which is recorded on a recording medium, particularly of additionally-recordable type recording medium capable of recording information only once, in a manner completely unreadable.

According to one aspect of the present invention, there is provided an information recording and reproducing apparatus including a data processing unit which generates processed data generated by processing recording data to be recorded on a recording medium, and restoring data necessary for restoring the recording data from the processed data, a recording unit which records the recording data as the processed data and the restoring data at different positions on the recording medium, and an erasing unit which makes the restoring data recorded on the recording medium unreadable when the recording data is erased.

The above-mentioned information recording and reproducing apparatus records, reproduces and erases the information to the recording medium, such as a DVD-R and the like. When obtaining the recording data to be recorded on the recording medium, the information recording and reproducing apparatus generates the processed data by processing it and the restoring data necessary for restoring the recording data from the processed data. The processed data can be generated by various data processes such that original recording data cannot be restored without the restoring data. A preferable example of the processed data is encrypted data, and a preferable example of the restoring data is key data for decrypting the encrypted data. The information recording and reproducing apparatus records the processed data and the restoring data at different positions on the recording medium.

When the recording data which is recorded by the above method is erased, the information recording and reproducing apparatus makes the restoring data unreadable. As explained above, since the processed data cannot be restored to the original recording data without the restoring data, making only the restoring data unreadable is substantially equivalent to erasing the recording data. Namely, if only the restoring data is made unreadable, no process is necessary for the processed data recorded on the recording medium. Therefore, since performing the process of making only a portion of the restoring data unreadable is enough even for a comparatively large quantity of the recording data, erasing the recording data is possible in a short time.

In a preferred embodiment, the erasing unit may make an area on the recording medium at which the restoring data is recorded physically unreadable. As a method of making the area physically unreadable, there are some methods, e.g., generating a physical defect on the recording medium, or largely varying a refraction index of the area, by performing overwriting recording with an accumulated recording power larger than a normal recording power.

In another preferred embodiment, the information recording and reproducing apparatus may include a defect management unit which manages a defect area on the recording medium, and the erasing unit may register an area on the recording medium at which the restoring data is recorded as the defect area in the defect management unit. In the method, instead of forming the physical defect on the recording medium, a defect management system treats the portion of the restoring data as the defect. Generally, in the information recording and reproducing apparatus adapted to the defect management system, access is not performed to the area on the recording medium registered as the defect. Therefore, the restoring data is not read out, even though the restoring data is maintained recorded. Thus, restoring the processed data becomes impossible, and erasing the recording data is realized. In the method, it is necessary that the information recording and reproducing apparatus includes the defect management unit. However, there is such a merit that the physical defect does not have to be formed on the recording medium.

In the above case, the erasing unit can record predetermined meaningless data instead of the restoring data in a substitute area corresponding to the defect area. In a general defect management system, the information is recorded in the substitute area corresponding to the area which is registered as the defect area. Therefore, in registering the area of the restoring data as the defect area, if the meaningless data (any data other than the restoring data is available) is recorded in the correspondent substitute area, obtaining the restoring data is prevented and completely erasing the recording data is possible.

In addition, the recording unit can record predetermined data, following the restoring data, in a unit area which enables obtaining position information, such as address information on the recording medium. Usually, in accessing a certain area on the recording medium, it is necessary to obtain the position information, such as the address information, from a preceding area. As described above, if the recording area of the restoring data is made unreadable at the time of erasing the recording data, the position information cannot be obtained from the area. Therefore, it substantially becomes impossible to access the area immediately after the recording area of the restoring data. Thus, by keeping the unit area, in which the address information and the like can be obtained, following the restoring data, it becomes possible to enable an access to an area following it.

Preferably, the restoring data includes information which indicates that the data is the restoring data, and information which indicates a recording position on the information recording medium of the processed data. Thereby, the processed data and the restoring data can be obtained easily at the time of reproducing the recording data, and the area of the restoring data to be made unreadable can be specified easily at the time of erasing the recording data.

In the information recording and reproducing apparatus, as the method of erasing the recording data, a normal erasing method can be used in combination with the above-mentioned method. Namely, the information recording and reproducing apparatus may include a unit which receives a choice of a first erasing method or a second erasing method from a user, and the recording unit can record the recording data as the processed data and the restoring data when the first erasing method is chosen, and can record the recording data as it is when the second erasing method is chosen.

According to a similar aspect of the present invention, there is provided an information recording and erasing method which performs recording and erasing of recording data to a recording medium, including a data processing process which generates processed data generated by processing the recording data to be recorded, and restoring data necessary for restoring the recording data from the processed data, a recording process which records the recording data as the processed data and the restoring data at different positions on the recording medium, and an erasing process which makes the restoring data recorded on the recording medium unreadable when the recording data is erased. Identically to the above-mentioned information recording and reproducing apparatus, by the information recording and erasing method, complete erasing of the recording data can be performed in a short time, too.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

[Information Recording and Reproducing Apparatus]

Figure 1:
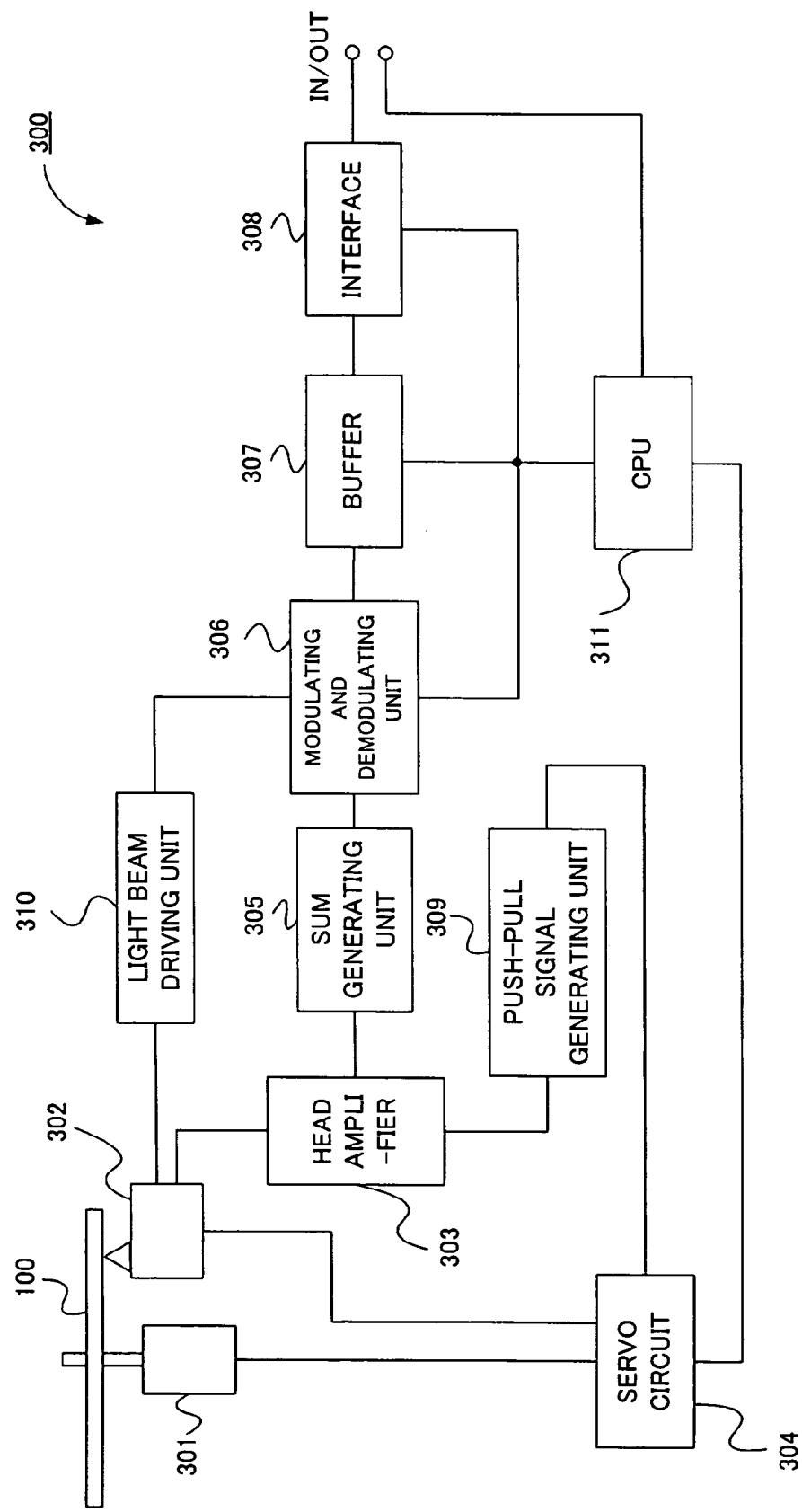
FIG. 1 is a diagram showing a schematic configuration of an information recording and reproducing apparatus according to the present invention.

First, an information recording and reproducing apparatus according to the present invention will be explained. FIG. 1 is a diagram showing a schematic configuration of an information recording and reproducing apparatus 300 according to the present invention. The information recording and reproducing apparatus 300 shown in FIG. 1 has two functions, i.e., a function as a recording apparatus which records recording data on an optical disc 100, such as a DVD-R and the like, and a function as a reproducing apparatus which reproduces the recording data recorded on the optical disc 100. Further, the information recording and reproducing apparatus 300 also has a function of erasing the recording data.

The information recording and reproducing apparatus 300 includes a spindle motor 301, an optical pickup 302, a head amplifier 303, a servo circuit 304, a sum generating unit 305, a modulating and demodulating unit 306, a buffer 307, an interface 308, a push-pull signal generating unit 309, a light beam driving unit 310, and a CPU 311, as shown in FIG. 1.

The spindle motor 301 rotates the optical disc 100 at a predetermined speed. The optical pickup 302 includes a light source, such as a laser diode (LD) and the like, a photodetector and the like. The optical pickup 302 irradiates a laser light, emitted from the light source and serving as a recording light or a reproducing light, to the optical disc 100, and receives a return light from the optical disc 100 by the photodetector to output electric signals corresponding to the light receiving quantity. As the photodetector, for example, a quadruple photodetector having four light-receiving elements which are disposed respectively in a line in a radial direction and a tangential direction of the optical disc 100 is utilized. For example, the photodetector has four light-receiving elements A to D, wherein the light-receiving elements A and D are next to each other in the tangential direction of the optical disc 100, and the light-receiving elements B and C are next to each other in the tangential direction of the optical disc 100. Therefore, the light-receiving elements A and B receive the return light of an inside or an outside of a recording track, and the light-receiving elements B and C receive the return light on the other side.

The head amplifier 303 amplifies the electric signals from the respective light-receiving elements, and transmits them to the sum generating unit 305 and the push-pull signal generating unit 309. The sum generating unit 305 generates the sum of the electric signals from the four light-receiving elements A to D of the above-mentioned photodetector as a reproducing signal to transmit it to the modulating and demodulating unit 306.

The modulating and demodulating unit 306 is a circuit having a function of adding an error correction code to the recording information and modulating it at the time of recording, and a function of performing error correction of the recorded information at the time of reading it out. Concretely, the modulating and demodulating unit 306 adds the error correction code to the recording information outputted from the buffer 307 at the time of recording, modulates it so that it becomes the code suitable to an optical characteristic and the like of the optical disc 100, and outputs the modulated recording information to the light beam driving unit 310. On the other hand, the modulating and demodulating unit 306 demodulates the signal outputted from the sum generating unit 303 at the time of reading it out, performs the error correction, and outputs it to the buffer 307.

The buffer 307 is a storing circuit which temporarily stores the recording information. It is noted that the information recording and reproducing apparatus 300 has a first-reading function, and stores information which is first read at the time of reading out the information in the buffer 307.

The interface 308 is a circuit which executes input and output control or communication control of the recording information between the information recording and reproducing apparatus 300 and an external apparatus. Concretely, the interface 308 receives the recording information which is inputted from the external apparatus to the information recording and reproducing apparatus 300 at the time of recoding the information, and outputs it to the buffer 307. The interface 308 outputs, to the external apparatus, the recorded information outputted from the buffer 307, i.e., the recorded information which is read out from the optical disc 100, at the time of reproducing the information. For example, when the information recording and reproducing apparatus 300 is utilized as a peripheral apparatus of a personal computer, the external apparatus is the personal computer. When the information recording and reproducing apparatus 300 is incorporated in a DVD recorder or player, the external apparatus is a back end of the DVD recorder or player (e.g., units including a circuit which executes MPEG-compression/demodulation of sounds and images, and a circuit which executes an information-conversion process for finally outputting the sounds and the images).

On the other hand, the push-pull signal generating unit 309 calculates sum signals of the electric signals from the two light-receiving elements next to each other in the line in the tangential direction (e.g., the light-receiving elements A and D, and the light-receiving elements B and C) in the four light-receiving elements of the photodetector, respectively, and calculates a difference signal of two sum signals (=(A+D)−(B+C)), i.e., a so-called push-pull signal. Further, the push-pull signal generating unit 309 extracts low-frequency components from the inputted signal by an LPF (Low Pass Filter) circuit and the like (not shown), and generates a servo signal, such as a tracking servo signal and a focus servo signal, to supply them to the servo circuit unit 304.

The servo circuit 304 controls driving of the optical pickup 302 and the spindle motor 301 on the basis of the tracking servo signal and the focus servo signal. Concretely, the servo circuit 304 controls a relative position relation between the optical pickup 302 and the optical disc 100 on the basis of the tracking servo signal, and executes focusing control of the light beam of the optical pickup 302 on the basis of the focus servo signal.

At the time of recording the information, the light beam driving unit 310 generates a light beam driving signal corresponding to the recording information outputted from the modulating and demodulating unit 306, and outputs it to the optical pickup 302. The optical pickup 302 modulates the light beam on the basis of the light beam driving signal, and irradiates it on a recording surface of the optical disc 100. Thereby, the recording information is recorded on the recording surface. Moreover, the optical pickup 302 can erase the information which is recorded on the recording surface by irradiating the light beam of a varied refraction index.

The CPU 311 executes the whole control of the information recording and reproducing apparatus 300, and executes control and management of information exchange between each component in the above-mentioned information recording and reproducing apparatus 300. Further, in response to a request command which is transmitted from the back end (not shown), the CPU 311 executes reading-out operation control of the optical pickup 302, and executes outputting control of the recorded information which is stored in the buffer 307 to the back end. Thereby, the CPU 311 executes usual reading-out control and first-reading control of the recorded information. In recording the data on the optical disc 100 or erasing the data from the optical disc 100, the CPU 311 transmits a control signal and the like to each processing unit so that the next process is executed on the basis of an erasing option which a user inputs from the personal computer and the like, for example. The erasing option and the process at that time will be explained in detail later.

[Data Recording Method]

Figure 2:
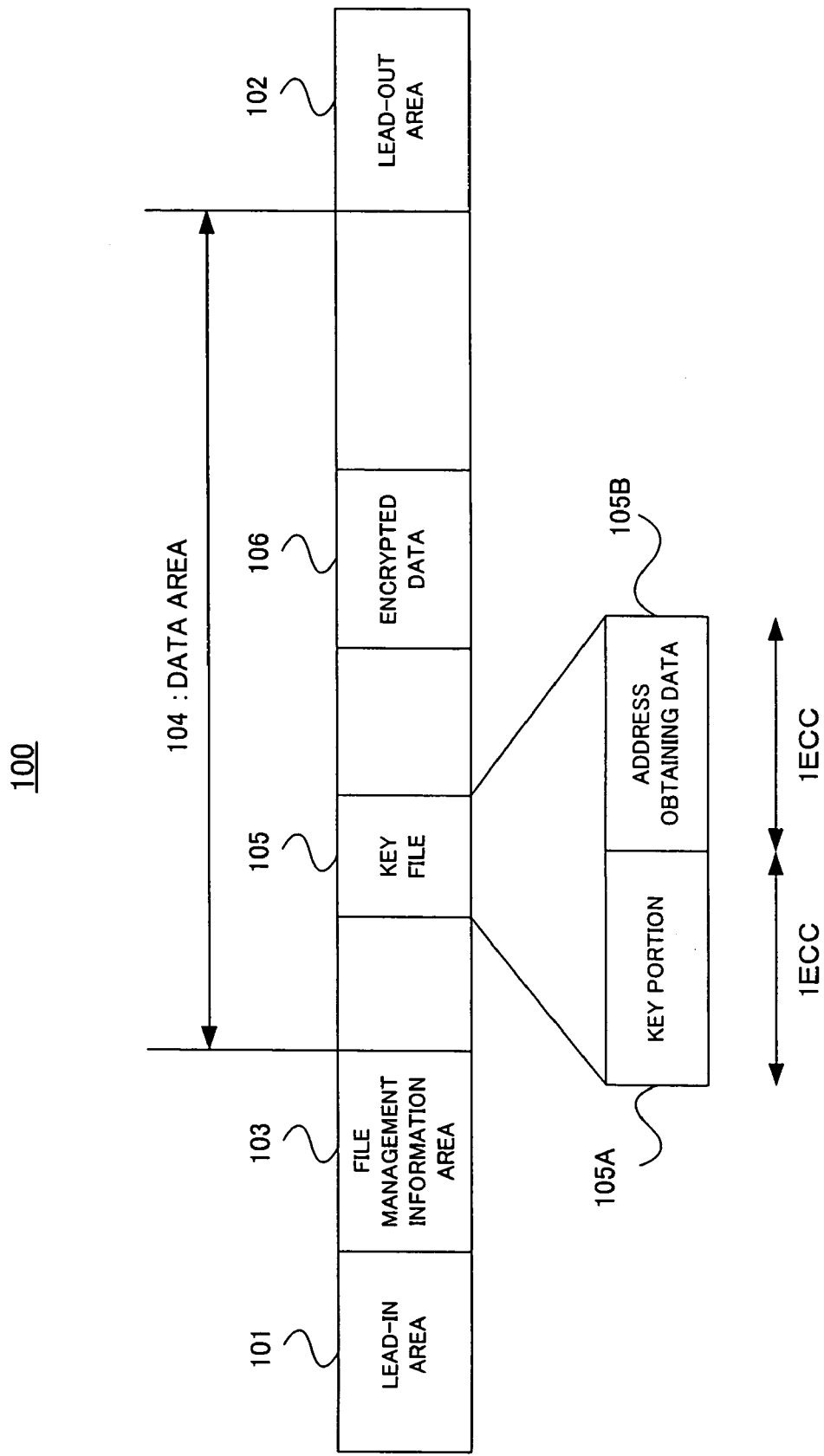
FIG. 2 is a diagram explaining a data recording method of the present invention.

Next, a data recording method of the present invention will be explained with reference to FIG. 2. FIG. 2 shows a data structure of the optical disc 100 on which recording is performed by the data recording method of the present invention. The optical disc 100 is an additionally-recordable type recording medium which can record the recording data only once, such as the DVD-R.

The optical disc 100 includes a lead-in area 101, a lead-out area 102, a file management information area 103, and a data area 104, as shown in FIG. 2. The left side in FIG. 2 indicates the inside of the optical disc 100, and the right side indicates the outside of the optical disc 100. The lead-in area 101 is inside, and the lead-out area 102 is outside.

The file management information area 103 and the data area 104 exist between the lead-in area 101 and the lead-out area 102. The data area 104 is an area for recording the recoding data. The recording data is data subjected to reproduction or execution, like image data, audio data, contents data, a computer program and the like. On the other hand, the file management information area 103 is an area for recording management information, like an address of the data stored in the data area 104.

In the method of the data recording according to the present invention, the user can choose the "erasing option"

indicating the method of erasing the recorded data. Namely, the user chooses the recording data and the like at the time of recording the information, and further sets the erasing option for the recording information. When the erasing option is set to an ON state, the recording data is completely erased. Namely, once the user executes the erasing command, the recorded data for which the erasing option is set to the ON state cannot be read out any longer. On the other hand, when the erasing option is set to an OFF state, erasing the recording data is performed by the normal erasing. Namely, the recording data is erased by the method identical to the conventional erasing method.

Next, the method of the data recording in a case that the erasing option is set to the ON state will be explained with reference to FIG. 2. Based on the recording data which is chosen by the user, data 106 which is encrypted with an encryption key (hereafter, it is called "encrypted data"), and a file 105 including a key for decrypting it (hereafter, it is called "key file") is generated. The encrypted data and the key file are separately recorded at different areas in the data area 104, as shown in FIG. 2. The key file 105 may include information, such as ID information, indicating that the file is the key file, and address information of the key file 105. The file management information for the key file 105 and the encrypted data 106 which are recorded in the data area 104 is recorded in the file management information area 103.

As described above, when the erasing option is set to the ON state, the recording data is recorded as the encrypted data 106, and the key file 105 including the key for decrypting the encrypted data is recorded independently of the encrypted data 106.

As shown in FIG. 2, the key file 105 includes a key portion 105A having the key for actually decrypting the encrypted data inside, and includes address obtaining data 105B after the key portion 105A (outside thereof). The address obtaining data 105B is an area provided for obtaining the address in reading out the data which is recorded following the key file 105 in the data area 104. Namely, in order to access the area immediately after the key file 105, the information recording and reproducing apparatus has to obtain the address information in an area ahead of an area immediately after the key file 105. Therefore, as will be described later, even when the key portion 105A becomes unreadable, the information recording and reproducing apparatus can obtain the address information by reading out the address obtaining data 105B, and can access the area following the address obtaining data 105B.

A data capacity of the key portion 105A depends on a data quantity of the key. On the other hand, a data capacity of the address obtaining data 105B is a unit data quantity that enables obtaining the address on the optical disc 100. For example, when the address on the disc can be obtained with 1 ECC area in the DVD-R, the address obtaining data 105B is prescribed to 1 ECC. It is prescribed that the data is not recorded or null data (zero) is recorded in the address obtaining data 105B and meaningful recording data, such as the image data, the audio data and the like, is not recorded. This is because the data recorded in the address obtaining data 105B becomes unreadable after the recording data is completely erased, which will be explained later.

In the example in FIG. 2, the data capacity of the key portion 105A having the key for decrypting the encrypted data is 1 ECC block, and the address obtaining data of 1 ECC is necessary. Therefore, the key file 105 has the data capacity of 2 ECC blocks, in total.

Figure 5:
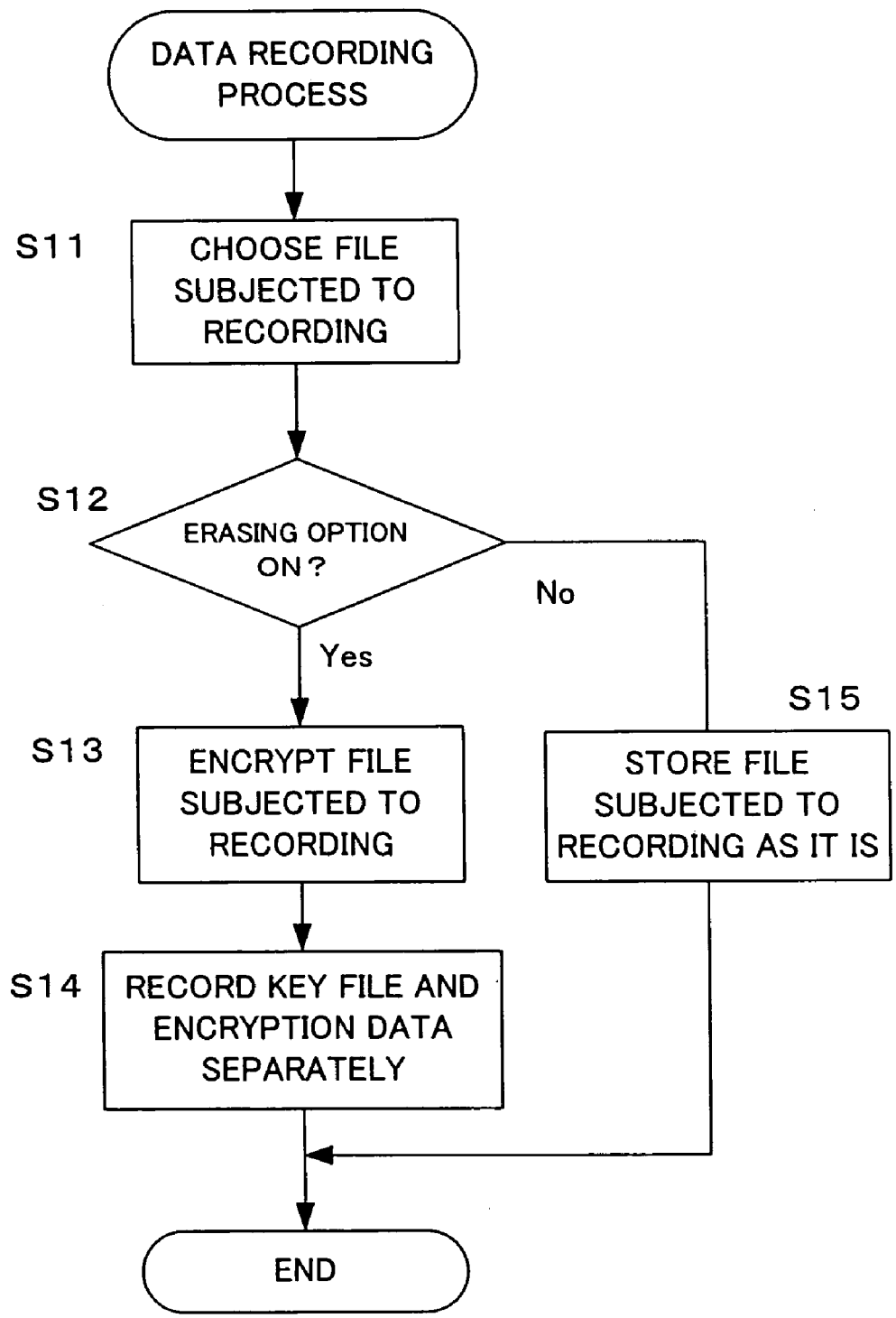
FIG. 5 is a flow chart showing a procedure of a data recording processing of the present invention.

Next, a data recording process by the information recording and reproducing apparatus 300 of the embodiment will be explained with the reference to a flow chart in FIG. 5. The CPU 311 shown in FIG. 1 executes a program prepared in advance, which controls each component in the information recording and reproducing apparatus 300. Thereby, the data recording process which will be explained later is executed.

First, in step S11, the information recording and reproducing apparatus 300 receives the choice of a file subjected to recording by the user. The file subjected to recording is a file which the user designates as a file to be recorded on the optical disc 100. The information of the file subjected to recording, which the user chooses, is inputted from an input and output device which is not shown, like a remote controller, to the information recording and reproducing apparatus 300 via the interface 308.

Next, in step S12, the CPU 311 determines whether the user sets the erasing option to the ON state or the OFF state for the file subjected to recording, which is chosen in step S11. The setting is also performed by the user who operates the remote controller and the like. If the erasing option is set to the ON state, the file subjected to recording which is recorded on the optical disc 100 is completely erased (i.e., the file cannot be restored), when the erasing command is executed for the file afterward.

When the erasing option is set to the ON state (step S12; Yes), encryption is executed to the file subjected to recording which the user chooses, in step S13. In the process, for example, the CPU 311 executes the encryption process to the file subjected to recording temporarily stored in a memory (not shown), which is incorporated in the buffer 307 or the CPU 311, and generates the encrypted data 106. Moreover, the CPU 311 generates the key portion 105A which is used to decrypt the encrypted data, and adds the above-mentioned address obtaining data 105B to the key portion 105A to generate the key file 105. The encrypted data 106 and the key file 105 thus generated are transmitted to the modulating and demodulating unit 306, where the error correction code is added to each of them, and they are transmitted to the light beam driving unit 310. It is noted that the above key file 105 is generated, for example, every time the CPU 311 executes the recording process, i.e., for each file subjected to recording which the user chooses.

Next, in step S14, as shown in FIG. 2, the encrypted data 106 and the key file 105 are recorded at different positions in the data area 104, respectively. The process is executed as follows. First, the light beam driving unit 310 generates the light beam driving signal corresponding to the encrypted data 106 and the key file 105, and outputs the signals to the optical pickup 302. Next, the optical pickup 302 modulates the light beam on the basis of the light beam driving signals, and irradiates the light beam on the recording surface of the optical disc 100. Thereby, the encrypted data 106 and the key file 105 are recorded on the recording surface of the optical disc 100. In addition, the file management information is recorded in the file management information area 103.

On the other hand, when the erasing option is set to the OFF state (step S12; No), the file subjected to recording is recorded by a normal method. Namely, the recording data is recorded as it is (without being encrypted) in the data area 104, and the file management information is recorded in the file management information area 103.

Like this, when the erasing option is set to the ON state, the file subjected to recording is recorded after being encrypted, and the key for decrypting, the encrypted data is separately recorded. On the other hand, when the erasing option is set to the OFF state, the file subjected to recording is recorded as it is.

[Method of Erasing Data]

Next, the description will be given of a method of erasing data for erasing the recorded file which is recorded by the above-mentioned method.

(1st Embodiment)

Figure 3:
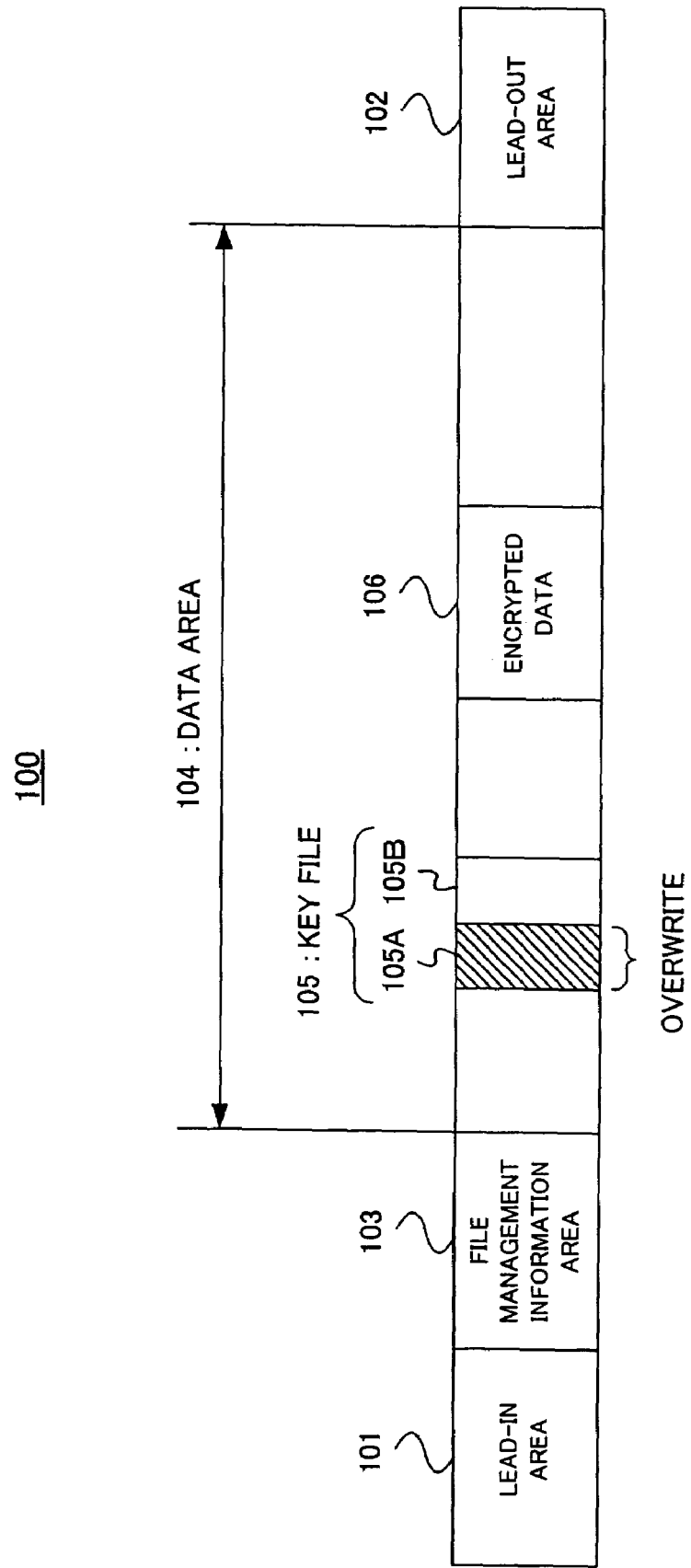
FIG. 3 is a diagram explaining a method of erasing data according to a first embodiment.

First, the method of erasing data according to the first embodiment of the present invention will be explained with reference to FIG. 3. FIG. 3 shows a data configuration of the optical disc 100 on which the recorded file is recorded with the erasing option set to the ON state by the above-mentioned data recording method.

Namely, as shown in FIG. 3, the key file 105 and the encrypted data 106 are separately recorded in the data area 104. The information indicating whether the erasing option of the recorded file is set to the ON state or the OFF state can be recorded in the file management information area 103, for example. As explained above, the key file 105 is configured by the key portion 105A and the address obtaining data 105B.

In the embodiment, when the recorded file which is recorded by the above-mentioned method with setting the erasing option to the ON state is erased, only the key portion 105A in the key file 105 is overwritten, and the encrypted data 106 serving as actual recording data is not overwritten. Therefore, the encrypted data 106 remains recorded on the optical disc 100. However, since the data 105A including the key is overwritten and physically becomes unreadable, it becomes impossible to obtain the key for decrypting the encrypted data 106. Thereby, it eventually becomes impossible to decrypt the encrypted data 106, and the recorded file is substantially completely erased.

Since only the key portion 105A is overwritten and the area of the address obtaining data 105B following the key portion 105A is not overwritten, nothing impedes the access to the data area next to the key file 105.

Further, in the method of erasing data according to the embodiment, since only the key portion 105A of 1 ECC block is overwritten, only the target recorded file can be erased in a short time. Namely, when the file subjected to recording is recorded on the optical disc 100 without being encrypted by the normal recording method, it is necessary that whole the recorded file is overwritten so that the recorded file is completely erased. However, since the recorded file itself usually has large capacity, e.g., several Mega Bytes, it takes quite a long time to overwrite the entire recorded file. On the contrary, in the complete erasing method of the present invention, the recorded file itself which is recorded as the encrypted data 106 is not overwritten, but left as it is, and, only the key portion 105A including the key for decrypting the encrypted data 106 is overwritten. Therefore, the time necessary for erasing the file can be shortened a lot.

In addition, in the complete erasing method of the present invention, erasing the file is performed by utilizing the encryption process in a physical layer lower than a file management layer, not by the process of only the file management information. Thus, the problem that the file which have been apparently erased can be restored, like in the case that erasing the file is performed by only the file management information, can be solved. And, the erased data can surely be protected.

Figure 6:
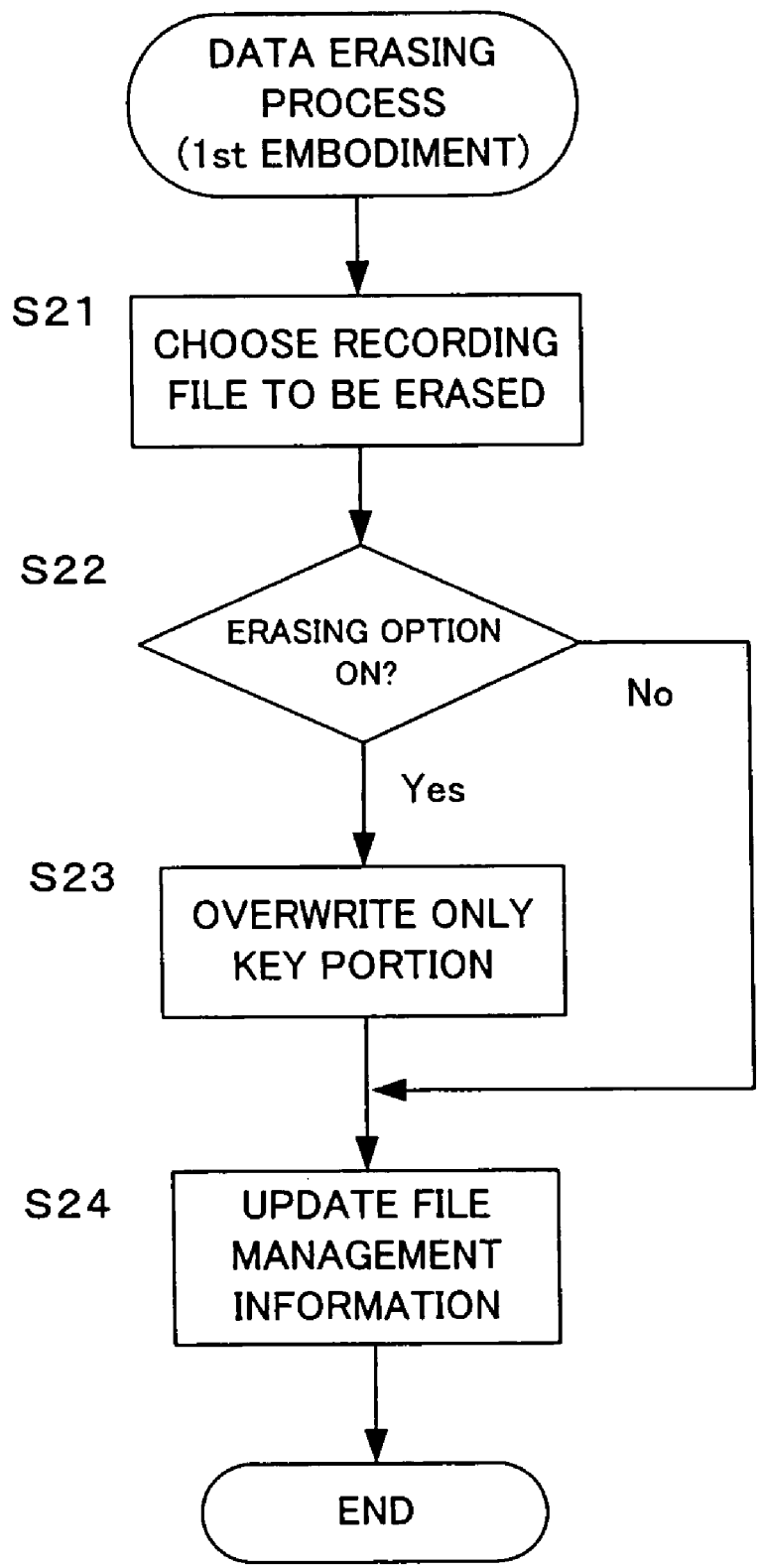
FIG. 6 is a flow chart showing a procedure of a data erasing processing according to a first embodiment.

Next, the data erasing process of the embodiment will be explained with reference to a flow chart in FIG. 6. The data erasing process explained below is performed when the CPU 311 shown in FIG. 1 executes the program prepared in advance and each component in the information recording and reproducing apparatus is controlled.

First, in step S21, the user chooses the file which the user wants to erase from the information read out from the optical disc 100, and the CPU 311 receives the choice from the user.

Next, in step S22, the CPU 311 determines whether the erasing option is set to the ON state or the OFF state to the file which is chosen in step S21. It is noted that the determination by the CPU 311 can be executed by reading out the information associated with the erasing option recorded in the file management information area 103, for example.

When the erasing option is set to the ON state (step S22; Yes), the CPU 311 overwrites only the key portion 105A of the key file 105 corresponding to the chosen file, as described above, in step S23. In the process, the CPU 311 transmits, to the light beam driving unit 310, the information of the data area to be erased, i.e., the address information of the key portion 105A, and the light beam driving unit 310 overwrites the area of the optical disc 100 by an appropriate laser power. For example, if the optical disc is the DVD-R, the overwriting is performed by irradiating the recording beam with the laser power (accumulated power) larger than the normal data recording, and the key portion 105A is physically made unreadable by varying the refraction index of the optical disc 100 of the overwriting portion.

When the process in step S23 ends, or when the erasing option is set to the OFF state (step S22; No), the process goes ahead to step S24, and the CPU 311 updates the file management information area 103. Namely, when the process in step S23 ends, the CPU 311 erases a file name of the erased file from the file management information area 103, in step S24. On the other hand, when the erasing option is set to the OFF state (step S22; No), the erasing is performed by the normal method. Namely, the CPU 311 executes only updates anew file management information area, and executes the process of erasing the file name of the erased file from the new file management information area in the file management information area 103. In a file system in which the setting of an unused definition area is necessary, the setting is also updated.

As described above, according to the first embodiment, for the recorded file for which the erasing option is set to the ON state, the key file 105 is made physically unreadable by overwriting only the potion of the key file 105. Thereby, decrypting the encrypted data 106 is made impossible, and the recorded file which is recorded as the encrypted data can be substantially completely erased.

(2nd Embodiment)

A method of erasing data according to the second embodiment of the present invention will be explained with reference to FIG. 4. In the second embodiment, the information recording and reproducing apparatus 300 is adopted to a defect management system. The second embodiment is different from the first embodiment in that the file is erased by the method utilizing defect management system.

Figure 4:
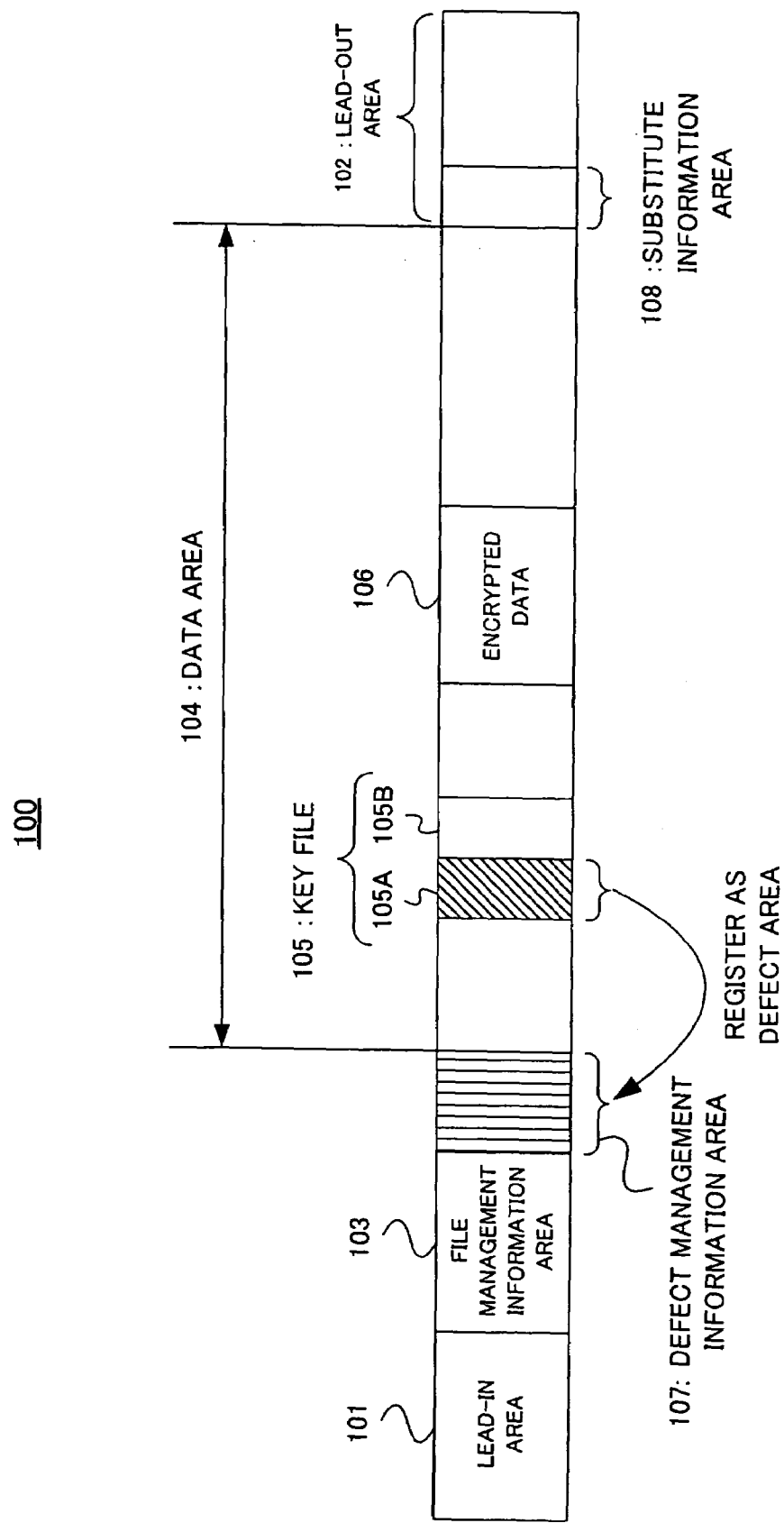
FIG. 4 is a diagram explaining a method of erasing data according to a second embodiment.

FIG. 4 shows a data structure of the optical disc 100 recorded with the erasing option set to the ON state by the above-mentioned recording method. The optical disc 100 includes the lead-in area 101, the lead-out area 102, the file management information area 103, and the data area 104, as shown in FIG. 4. In addition, in the present embodiment, the optical disc 100 further includes a defect management information area 107.

The left side in FIG. 4 is the inside of the optical disc 100, and the right side is the outside of the optical disc 100. The lead-in area 101 is on the inside, and the lead-out area 102 is on the outside. In the lead-out area 102, a substitute information area 108, which will be explained in detail later, is formed. It is noted that the substitute information area 108 may be provided in a position, other than in the lead-out area 102, for example, in the lead-in area 101.

The data structure in the data area 104 before erasing the recorded file is in a state that the key file 105 and the encrypted data 106 are separately recorded, as shown in FIG. 2. In the first embodiment, the key portion 105A in the key file 105 is overwritten to be physically unreadable. Instead, in the second embodiment, the key portion 105A is treated as the defect area by the defect management system. Namely, the key portion 105A is registered as the defect area in the defect management information area 107. Thereby, since the key portion 105A is never readout, the encrypted data 106 cannot be decrypted. Therefore, it is equivalent that the encrypted data 106 is substantially completely erased.

The defect management system is a technique which is performed for improving reliability of recording and reading-out of the recording data in a high-density recording medium, such as the optical disc, a magnetic disc, a magneto-optical disc and the like. Namely, when a flaw, dust or deterioration of the recording medium (they are generally called "defect") exist on the recording medium, the data recorded or to be recorded at the position at which the defect exists are recorded in other area on the recording medium (hereafter, it is called "substitute information area 108"). Like this, if the recording data which may become unrecordable or unreadable by the defect is moved to the substitute information area 108, the reliability of recording and reading out of the recording data can be improved.

In the defect management information area 107, the address information indicating the position of the defect which exists on the optical disc 100 and the address information indicating the position in the substitute information area 108 (e.g., the recording position in the substitute information area 108) to which the data recorded or to be recorded at the position of the defect are moved.

Next, the detailed description will be given of the method of erasing data according to the embodiment in which the defect management system is utilized. In the embodiment, when the erasing command is executed to the recorded file, the information indicating that the key portion 105A in the file 105 including the key is the defect is written to the defect management information area 107. On the other hand, the area of the address obtaining data 105B in the key file 105 and the area of the encrypted data 106 are not registered as the defect areas. Generally, the substitute information area 108 is prepared in the defect management system, and if there is an area registered as the defect, the information recording and reproducing apparatus refers to the defect management information in the defect management information area 107, and searches the data of a correspondent area in the substitute information area 108, instead of the area registered as the defect area. Therefore, in the present embodiment, not the data identical to the key portion 105A, but meaningless data, such as null data or dummy data, is recorded in the substitute information area 108.

As explained above, since the information recording and reproducing apparatus 300 recognizes the key portion 105A as the defect area, the portion is never accessed even when the data including the key is actually recorded in the portion. Therefore, the key is never read out. In addition, the key data is not recorded in the area in the substitute information area 108 corresponding to the key portion 105A registered as the defect area, either. Thus, the key for decrypting the encrypted data 106 cannot be obtained after all, and the encrypted data 106 cannot be restored. In that way, substantially, the recorded file is completely erased. It is noted that data can be only additionally recorded in the defect management information area 107. Therefore, once the key portion 105A is registered as the defect in the defect management information area 107, the registration is never changed afterward, and the key data in the key portion 105A is not read out.

As described above, since the key for decrypting the encrypted data cannot be obtained by the method of erasing the data according to the second embodiment, the recorded file recorded as the encrypted data can be substantially completely erased. In addition, since the process of registering the key portion 105A as the defect area by the defect management system can be done in a short time, it is possible to erase the target recorded file in a short time.

The method of the second embodiment is feasible only in the information recording and reproducing apparatus adopted to the defect management system, and the method of the first embodiment is feasible in the information recording and reproducing apparatus which is not adopted to the defect management system. However, since the key portion 105A is physically made unreadable by being overwritten in the first embodiment, the defect area which is physically unreadable is unavoidably formed on the optical disc. Generally, an information recording and reproducing apparatus is configured not to access the defect area. However, for example, if the defect area is scanned in a search operation and the like, malfunction of the tracking servo and/or other problem may happen at the defect area. In that point, the second embodiment has an advantage that the above-mentioned problems do not occur. This is because, in the second embodiment, the key portion 105A is only registered as the defect area by utilizing the defect management system, and the physical defect is not formed on the optical disc by physically overwriting the key portion 105A.

Figure 7:
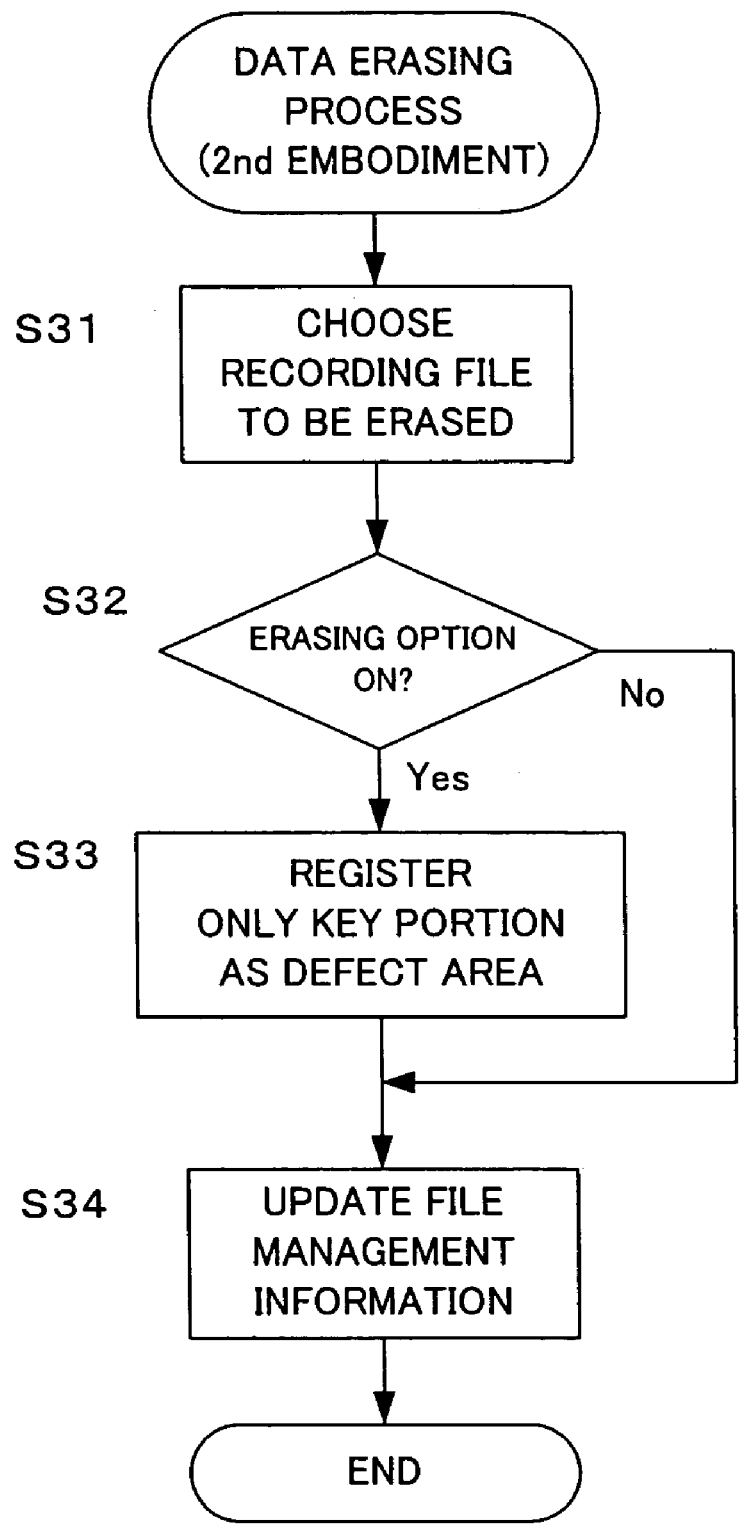
FIG. 7 is a flow chart showing a procedure of a data erasing processing according to a second embodiment.

Next, the data erasing process of the present embodiment will be explained with reference to a flow chart in FIG. 7. The following data erasing process is also executed by the CPU 311 shown in FIG. 1 which executes the program prepared in advance and each component in the information recording and reproducing apparatus.

First, in step S31, the user chooses the file to be erased from the information read out from the optical disc 100, and the CPU 311 receives the choice from the user.

Next, in step S32, the CPU 311 determines whether the erasing option is set to the ON state or the OFF state for the file which is chosen in step S31. It is noted that the determination by the CPU 311 can be executed by reading out the information associated with the erasing option which is recorded in the file management information area 103, for example.

When the erasing option is set to the ON state (step S32; Yes), as described above, the key portion 105A corresponding to the recorded file chosen as the object of erasing is registered as the defect area in step S33. Namely, the CPU 311 commands that the information indicating that the key portion 105A in the key file 105 is the defect area is written in the defect management information area 107. Moreover, when the substitute information area 108 is provided, the CPU 311 records, in the area of the substitute information area 108, not the data identical to the key portion 105, but the meaningless data such as the null data or the dummy data, and registers the address of the area of the substitute information area 108 to the defect management information area 107.

When the process in step S33 ends, or when the erasing option is set to the OFF state (step S32; No), the process goes ahead to step S34, and the file management information area 103 is updated. Namely, when the process in step S33 is performed, the CPU 311 erases the file name of the key file 105 which is registered as the defect are a from the file management information area 103 in step S34. On the other hand, when the erasing option is set to the OFF state (step S32; No), in the file management information area 103, the CPU 311 only updates the new file management information area as usual, and erases the file name of the recorded file to be erased from the new file management information area.

[Modification]

Though the address obtaining data 105B in the key file 105 is 1 ECC block in the above embodiment, the value depends on the kind of the utilized optical disc. Namely, the data quantity (area) required as the address obtaining data 105B is determined as the data quantity (area) to be accessed in order to accurately obtain the address information in the additionally-recordable type recording medium. For example, in a certain recording medium in which 2 ECC blocks are necessary for obtaining the address information, the address obtaining data 105B is provided to have the quantity of 2 ECC blocks.

In the above second embodiment, at the time of completely erasing the recorded file, when the key portion 105A in the key file 105 is registered as the defect area, the meaningless data such as the null data or the dummy data is recorded in the substitute information area 108. The reason is that the defect management system is generally configured to read out the correspondent substitute information area, if the defect area exists during accessing the disc. Therefore, the dummy data and the like do not have to be recorded in the substitute information area in a system which is configured not to necessarily read the substitute information area when the defect area is registered.

The methods of the above first and second embodiments may be combined. Namely, the apparatus may be configured such that the key portion 105A is overwritten and registered as the defect area when it is commanded to erase the recorded file for which the erasing option is set to the ON state.

It is also possible that the address information on the optical disc 100 of the correspondent encrypted data 106 is included in the key file 105, and the address information is not recorded in the file management system 103. Thereby, after the key portion 105A of the key file 105 is made unreadable, the recording address of the encrypted data 106 can not be obtained, either.

In the above embodiment, the encrypted data and the key for decrypting it are generated by encrypting the file subjected to recording, and each of them is recorded in the separate areas. However, in the present invention, the method of processing the file subjected to recording, like this, is not limited to the encryption by the key. Namely, processed data and certain restoring data necessary for restoring the original file subjected to recording from the processed data may be generated by applying some kind of processing, such as encoding and the like, to the file subjected to recording. An example of such the processing is the encryption, and an example of the restoring data for restoring the encrypted data is the key.

Further, in the above-mentioned embodiment, the description is given of the information recording and reproducing apparatus which erases the recoding data recorded in the additionally-recordable type recording medium as the example. However, the present invention may be applied to the information recording and reproducing apparatus which erases the recording data recorded on the rewritable recording medium, such as a DVD-RW, a DVD-RAM and the like.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-199226 filed on Jul. 18, 2003 including the specification, claims, drawings and summary is incorporated herein by reference in its entirety.

What is claimed is:

1. An information recording and reproducing apparatus comprising:
    a data processing unit which generates processed data generated by processing recording data to be recorded on a recording medium, and restoring data necessary for restoring the recording data from the processed data;
    a recording unit which records the recording data as the processed data and the restoring data at different positions on the recording medium;
    an erasing unit which makes the restoring data recorded on the recording medium unreadable when the recording data is erased; and
    a defect management unit which manages a defect area on the recording medium, wherein the erasing unit registers an area on the recording medium at which the restoring data is recorded as the defect area in the defect management unit.

2. The information recording and reproducing apparatus according to claim 1, wherein the erasing unit makes an area on the recording medium at which the restoring data is recorded physically unreadable.

3. The information recording and reproducing apparatus according to claim 2, wherein the erasing unit performs recording with an accumulated recording power larger than a normal recording power in the area on the recording medium at which the restoring data is recorded.

4. The information recording and reproducing apparatus according to claim 1, wherein the erasing unit records predetermined meaningless data, instead of the restoring data, in a substitute area corresponding to the defect area.

5. The information recording and reproducing apparatus according to claim 1, wherein the recording unit records predetermined data in a unit area which enables obtaining position information on the recording medium, following the restoring data.

6. The information recording and reproducing apparatus according to claim 1, wherein the restoring data comprises data which indicates that the data is the restoring data, and data which indicates a recording position on the information recording medium of the processed data.

7. The information recording and reproducing apparatus according to claim 1, wherein the processed data is encrypted data, and wherein the restoring data is key data for obtaining the recording data by decrypting the encrypted data.

8. The information recording and reproducing apparatus according to claim 1, further comprising a unit which receives a choice of a first erasing method or a second erasing method as a method of erasing the recording data from a user, wherein the recording unit records the recording data as the processed data and the restoring data when the first erasing method is chosen, and records the recording data as it is when the second erasing method is chosen.

9. An information recording and erasing method which performs recording and erasing of recording data to a recording medium, comprising:

a data processing process which generates processed data generated by processing the recording data to be recorded, and restoring data necessary for restoring the recording data from the processed data;

a recording process which records the recording data as the processed data and the restoring data at different positions on the recording medium; and an erasing process which makes the restoring data recorded on the recording medium unreadable when the recording data is erased, wherein the erasing process registers an area on the recording medium at which the restoring data is recorded as the defect area in a defect management unit which manages a defect area on the recording medium.

* * * * *